(12) United States Patent
Dong et al.

(10) Patent No.: US 11,391,994 B2
(45) Date of Patent: Jul. 19, 2022

(54) ADHESIVE, DISPLAY PANEL AND MANUFACTURING METHOD THEREOF, DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Anxin Dong, Beijing (CN); Haibin Yin, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 525 days.

(21) Appl. No.: 16/466,950

(22) PCT Filed: Oct. 19, 2018

(86) PCT No.: PCT/CN2018/110972
§ 371 (c)(1),
(2) Date: Jun. 5, 2019

(87) PCT Pub. No.: WO2019/205520
PCT Pub. Date: Oct. 31, 2019

(65) Prior Publication Data
US 2021/0333584 A1     Oct. 28, 2021

(30) Foreign Application Priority Data

Apr. 24, 2018 (CN) .......................... 201810375179.7

(51) Int. Cl.
*G02F 1/1339* (2006.01)
*C09J 5/00* (2006.01)
(Continued)

(52) U.S. Cl.
CPC .............. *G02F 1/1339* (2013.01); *C09J 5/00* (2013.01); *C09J 11/08* (2013.01); *G02F 1/133512* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 2014/0002778 A1* | 1/2014 | Lin ........................ | G02F 1/1339 349/106 |
| 2017/0176788 A1 | 6/2017 | Fukuoka et al. | |
| 2019/0040287 A1* | 2/2019 | Loy ....................... | C08K 5/1545 |

FOREIGN PATENT DOCUMENTS

| | | |
|---|---|---|
| CN | 105158990 A | * 12/2015 |
| CN | 105158990 A | 12/2015 |

(Continued)

OTHER PUBLICATIONS

International Search Report and Written Opinion dated Feb. 3, 2019;PCT/CN2018/10972.

*Primary Examiner* — Shan Liu

(57) ABSTRACT

An adhesive, a display panel and a manufacturing method thereof, and a display device are provided. The adhesive includes a base bonding material and a light-shielding particle, and the light-shielding particle includes a degradable coating layer and a light-shielding material wrapped by the degradable coating layer.

14 Claims, 4 Drawing Sheets

(51) Int. Cl.
*C09J 11/08* (2006.01)
*G02F 1/1335* (2006.01)

(56) References Cited

FOREIGN PATENT DOCUMENTS

| | | | |
|---|---|---|---|
| CN | 105259698 A | | 1/2016 |
| CN | 105885722 A | | 8/2016 |
| CN | 105891940 A | * | 8/2016 |
| CN | 106094356 A | | 11/2016 |
| CN | 106675436 A | | 5/2017 |
| CN | 108535920 A | | 9/2018 |
| KR | 20150011242 A | * | 1/2015 |

* cited by examiner

ADHESIVE, DISPLAY PANEL AND MANUFACTURING METHOD THEREOF, DISPLAY DEVICE

CROSS REFERENCES TO RELATED APPLICATIONS

The application claims priority to the Chinese patent application No. 201810375179.7 filed on Apr. 24, 2018 to CNIPA under the title of "adhesive, display panel and manufacturing method thereof, and display device", the entire disclosure of which is incorporated herein by reference as part of the present application.

TECHNICAL FIELD

Embodiments of the present disclosure relate to an adhesive, a display panel and a manufacturing method thereof, and display device.

BACKGROUND

With development of electronic science and technology and demands of social development, liquid crystal display panels have been widely used in various display devices due to their characteristics of lightness, thinness, good shock resistance, wide viewing angle and high contrast ratio.

For instance, a liquid crystal display panel includes an array substrate, a color filter substrate, and a sealant located between the array substrate and the color filter substrate. The sealant is arranged, for instance, in a sealing region of the display panel for bonding the array substrate with the color filter substrate, and for assembling the array substrate with the color filter substrate to obtain a liquid crystal cell, and a liquid crystal material is filled between the array substrate and the color filter substrate.

SUMMARY

At least one embodiment of the present disclosure provides an adhesive including a base bonding material and a light-shielding particle; the light-shielding particle includes a degradable coating layer and a light-shielding material wrapped by the degradable coating layer.

For example, in the adhesive provided by an embodiment of the present disclosure, the light-shielding material includes a black ink or a black resin.

For example, in the adhesive provided by an embodiment of the present disclosure, the degradable coating layer includes a photodegradable plastic or a thermally degradable plastic.

At least one embodiment of the present disclosure further provides a display panel including: a first substrate; a second substrate arranged opposite to the first substrate; and a sealant located between the first substrate and the second substrate and configured to assemble the first substrate with the second substrate to form a cell. The sealant includes a base bonding material, a light-shielding material, and a component obtained upon a degradable coating layer being degraded; and the degradable coating layer is configured to wrap the light-shielding material to constitute a light-shielding particle.

At least one embodiment of the present disclosure provides a display panel including: a first substrate; a second substrate arranged opposite to the first substrate; and a sealant located between the first substrate and the second substrate and configured to assemble the first substrate with the second substrate to form a cell. The sealant is obtained by performing a curing treatment and a degrading treatment on the adhesive provided by any one of the embodiments of the present disclosure.

For example, in the display panel provided by an embodiment of the present disclosure, the second substrate further includes a light-shielding layer, the light-shielding layer includes an opening located in a sealing region of the second substrate, and the sealant covers the opening of the light-shielding layer.

For example, in the display panel provided by an embodiment of the present disclosure, the first substrate includes an array substrate, and the second substrate includes an opposing substrate.

At least one embodiment of the present disclosure further provides a display device including the display panel provided by any one of the embodiments of the present disclosure.

At least one embodiment of the present disclosure further provides a manufacturing method of a display panel including: providing a first substrate; providing a second substrate; coating an adhesive on the first substrate or the second substrate, assembling the first substrate with the second substrate by the adhesive to form a cell, the adhesive includes a base bonding material and a light-shielding particle, the light-shielding particle includes a degradable coating layer and a light-shielding material wrapped by the degradable coating layer; curing the adhesive; and performing a treatment on the adhesive to at least partially degrade the degradable coating layer and to expose the light-shielding material.

For example, in the manufacturing method provided by an embodiment of the present disclosure, the light-shielding material includes a black ink or a black resin.

For example, in the manufacturing method provided by an embodiment of the present disclosure, the degradable coating layer includes a photodegradable plastic or a thermally degradable plastic.

For example, in the manufacturing method provided by an embodiment of the present disclosure, the degradable coating layer is a photodegradable plastic, performing a treatment on the adhesive includes: performing a light irradiation on the adhesive to degrade the photodegradable plastic and to expose the wrapped light-shielding material; and the light irradiation includes ultraviolet light irradiation.

For example, in the manufacturing method provided by an embodiment of the present disclosure, the degradable coating layer is a thermally degradable plastic, performing a treatment on the adhesive includes: heating the adhesive to degrade the thermally degradable plastic and to expose the wrapped light-shielding material.

For example, in the manufacturing method provided by an embodiment of the present disclosure, performing a treatment on the adhesive further includes: heating the adhesive to diffuse the exposed light-shielding material in the adhesive.

For example, in the manufacturing method provided by an embodiment of the present disclosure, the second substrate includes a light-shielding layer, the light-shielding layer includes an opening located in a sealing region of the second substrate, the manufacturing method further includes: covering the opening of the light-shielding layer with the adhesive upon assembling the first substrate with the second substrate to form the cell; and performing a light irradiation on the adhesive from a side of the second substrate through the opening of the light-shielding layer to cure the adhesive;

the first substrate includes an array substrate, and the second substrate includes an opposing substrate.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure without constituting any limitation thereto.

DETAILED DESCRIPTION

Figure 1:
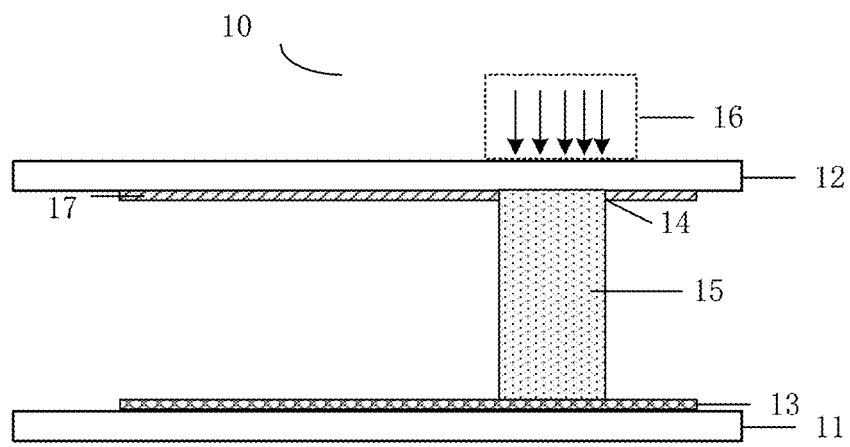
FIG. 1 is a cross-sectional view illustrating a structure of a display panel.

The technical solutions in the embodiments of the present disclosure will be clearly and completely described below in connection with the accompanying drawings in the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A sealant is usually arranged in a sealing region between an array substrate and a color filter substrate for assembling the array substrate with the color filter substrate to form a cell, and the sealant can also provide a sealed space for the liquid crystal layer in the liquid crystal display panel to prevent the liquid crystal layer from being affected by external air.

A component of an adhesive for forming a sealant includes a resin, and may further include an additive, a hardener, a photo-initiator, a filler, and the like as needed. The resin is, for instance, a heat-curable single-crystal resin or a phenolic resin, or an epoxy resin which is cured by ultraviolet (UV) light irradiation. Correspondingly, the adhesive is generally classified into a thermally-curable type and a UV photo-curable type. The UV photo-curable adhesive has become one of the commonly used types of adhesive, duo to advantages of UV curing technology, such as fast curing speed, no pollution, and curing at room temperature. In practice, an adhesive may also include both a thermally-curable resin and a UV photo-curable resin, that is, an adhesive has two curing properties; correspondingly, upon assembling the array substrate with the color filter substrate to form a cell with this type of adhesive, a UV light curing process is firstly performed to quickly cure a periphery (surface) of the adhesive to prevent the adhesive from contaminating the liquid crystal layer, followed by a thermal curing process to cure the adhesive as a whole to form a sealant to enhance a strength and an adhesion of the sealant.

For instance, as illustrated in FIG. 1, a display panel 10 includes a color filter substrate 11, an array substrate 12, a light-shielding layer 13, a sealant 15, a metal wiring 17, and the like. The metal wiring 17 is arranged on a side of the array substrate 12 facing the color filter substrate 11 for electrical connection, signal transmission, and the like. The arrangement of the metal wiring 17 can be adjusted to form an opening 14 in a sealing region of the display panel 10, and the opening 14 allows the UV light to pass therethrough so as to irradiate the adhesive 15 in a cell-assembling process. The adhesive 15 is disposed between the color filter substrate 11 and the array substrate 12 to seal the color filter substrate 11 and the array substrate 12 so that a cell is formed, and an end of the sealant 15 covers the opening 14. For instance, in a manufacturing process of the display panel 10, light is incident on an adhesive from a side where the array substrate 12 is located through the opening 14 of the metal wiring 17 to cure the adhesive so as to form the sealant 15.

For instance, with regard to the above-mentioned display panel, because the sealant 15 is transparent, when external light (for instance, light provided by a backlight) is incident on the display panel 10 from the side where the array substrate 12 is located, the external light passes through the sealant and exits from, for instance, a side where the color filter substrate 11 is located, so that undesired light leakage is caused in the sealing region of the display panel 10 including the sealant 15. For instance, light leakage in the sealing region of the display panel 10 would cause defects such as an increase in brightness of the display panel 10 in a dark state, a decrease in contrast ratio, and the like, thereby affecting image display quality of the display panel 10.

At least one embodiment of the present disclosure provides an adhesive including a base bonding material and a light-shielding particle, the light-shielding particle includes a degradable coating layer and a light-shielding material wrapped by the degradable coating layer.

The adhesive provided by at least one embodiment of the present disclosure includes a light-shielding particle, and can be cured and degraded to allow a light-shielding material of the light-shielding particle to be diffused in the base bonding material of the adhesive; therefore, the adhesive including the light-shielding particle has a light-shielding property. When a sealant obtained by performing a curing treatment and a degrading treatment on the adhesive is used in a display panel and when light provided by a backlight irradiates on the display panel, because the adhesive having been subjected to a curing process and a degrading process has a light-shielding property, the sealant can prevent the light of the backlight from exiting through the sealing region of the display panel, so as to avoid undesirable phenomena such as light leakage at an edge of the display panel. Therefore, the adhesive provided by the embodiment of the present disclosure can reduce a brightness of the display panel in a dark state, increase a contrast ratio of the display panel, and improve an image display quality of the display panel.

The present disclosure will be described as below with reference to several exemplary embodiments. In order to keep the following description of the embodiments of the present disclosure clear and concise, detailed descriptions of known functions and known components may be omitted. When any component of an embodiment of the present disclosure appears in more than one of the drawings, it may be denoted by the same reference numeral in each of the drawings.

Figure 2:
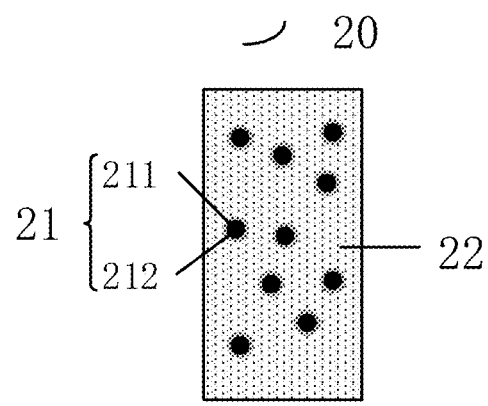
FIG. 2 is a cross-sectional view illustrating a structure of an adhesive provided by an embodiment of the present disclosure.

This embodiment provides an adhesive 20, and FIG. 2 is a cross-sectional view illustrating a structure of the adhesive 20. As illustrated in FIG. 2, the adhesive 20 includes a light-shielding particle 21 and a base bonding material 22, and the light-shielding particle 21 includes a degradable coating layer 211 and a light-shielding material 212 wrapped by the degradable coating layer 211, also referring to FIG. 6D. For instance, the adhesive 20 can be used in a display panel for assembling and sealing an array substrate with a color filter substrate to form a cell.

For instance, in an example, the adhesive 20 may be a photo-curable adhesive. The term "photo-" used herein may refer to light of any wavelength that achieves curing the adhesive. For instance, in an example, the adhesive 20 is a UV photo-curable adhesive, and the UV light used for curing may be, for instance, long-wave UV light, medium-wave UV light, short-wave UV light, or the like, but the embodiment of the present disclosure is not limited thereto. For instance, the adhesive 20 described in this embodiment refers to a state of a sealant before curing.

For instance, as illustrated in FIG. 2, in an example, the base bonding material 22 is a transparent bonding material. For instance, the base bonding material 22 includes a UV curing resin such as an epoxy resin, and may further include an additive, a hardener, a photo-initiator, a filler and so on. In another example, the base bonding material 22 includes, for instance, a thermosetting resin such as a single-crystal resin or a phenolic resin, and may further include an additive, a hardener, a photo-initiator, a filler, and the like. In still another example, the base bonding material 22 includes both a UV photo-curable resin and a thermosetting resin, and may also include an additive, a hardener, a photo-initiator, a filler, and the like. The additive, the hardener, the photo-initiator, the filler, and the like, may adopt known related materials. In at least one embodiment of the present disclosure, the light-shielding particles 21 are mixed in the base bonding material 22 of the adhesive 20, and are uniformly incorporated into the base bonding material 22, for instance, by way of stirring or the like. For instance, as illustrated in FIG. 2, an example of a material of the degradable coating layer 211 in the light-shielding particle 21 includes any suitable material such as a photodegradable plastic or a thermally degradable plastic.

For instance, in an example in which the degradable coating layer 211 is made of the photodegradable plastic, when the adhesive 20 is not irradiated with light (e.g., UV light), the photodegradable plastic 211 wraps the light-shielding material 212, and the adhesive 20 is, for instance, permeable to light as a whole. When the adhesive 20 is irradiated with light, the photodegradable plastic 211 is at least partially degraded under an irradiation condition, so that the light-shielding material 212 is exposed and is allowed to be diffused in the adhesive 20, thereby reducing a transmittance of the overall sealant 20 while representing opaqueness as a whole.

Photodegradable plastic absorbs light (such as UV light) and then an photo-initiation occurs. Under an action of the photo-initiation, long bonds of molecules in the photodegradable plastic are split, and the photodegradable plastic is initially degraded into fragments of lower molecular weights, and the integrity of the polymer is damaged, thereby degrading a physical property of the photodegradable plastic. These fragments can continue to be oxidized in nature, undergo a cleavage reaction of free radicals, and further be degraded into compounds of low molecular weights. The photodegradable plastic has been industrialized, and includes, for instance, a copolymer (i.e., E-CO copolymer) of polyethylene (PE) and carbon monoxide, or a copolymer of polyethylene and vinyl copper, and the like. Adding a photosensitizer to a photodegradable plastic can promote photo-degradation reaction, and a commonly used photosensitizer includes an aromatic ketone, an aromatic amine, and the like. A component (a fragment or a compound of a low molecular weight) obtained by degrading a photodegradable plastic varies depending on a composition, a degree of photo-degradation reaction, and the like of the photodegradable plastic. For instance, in an example, the photodegradable plastic 211 is a UV photodegradable plastic.

For instance, in another example, the degradable coating layer 211 may be a thermally degradable plastic, and the thermally degradable plastic may be degraded under a heating condition, and a thermal degradation reaction may include molecular chain depolymerization, random cleavage of molecular chains, substituent group removal and the like, without particularly set forth herein. For instance, a thermally degradable plastic includes polyacrylate, branched polyethylene, polyethylene, polyvinyl chloride (PVC), and the like. For instance, PVC has a thermal degradation temperature about greater than 200° C. A component (a fragment or a compound of a low molecular weight) obtained by degrading a thermally degradable plastic varies depending on a composition, a degree of a thermal degradation reaction, a type of a thermal degradation reaction, and the like of the thermally degradable plastic. For instance, the heating condition (for instance, a heating temperature, a heating time, etc.) may be adjusted correspondingly according to a material of the thermally degradable plastic 211.

It should be explained that the degradation method of the degradable coating layer 211 includes but is not limited to photo-degradation and thermal degradation, and may include any other suitable degrading method.

For instance, as illustrated in FIG. 2, an example of a material of the light-shielding material 212 includes, for instance, any suitable material having a light-shielding property such as a black ink, a black resin, or the like. The black ink includes, for instance, a carbon black particle or the like, without limiting the present embodiment of the present disclosure thereto. For instance, when the degradable coating layer 211 for wrapping the light-shielding material 212 is degraded, the light-shielding material 212 may be diffused into the base bonding material 22 of the adhesive 20. The degradation process of the degradable coating layer 211 and the diffusion process of the light-shielding material 212 will be described in details later, without particularly explained in this embodiment.

The light-shielding particle 21 in the embodiment of the present disclosure may be obtained by a conventional method for fabricating a particle with a core-shell structure, for instance, a surface polymerization coating method, a mechanical mixing method, a stepwise heterocoagulation method or the like, without limiting the embodiments of the present disclosure thereto. For instance, the mechanical mixing method mainly utilizes an impact force of a high-speed air stream to complete coating the particle. The stepwise heterocoagulation method utilizes an electrostatic attraction to attract cationic polymer particles of smaller particle size onto a surface of an anionic polymer particle of larger particle size to form a microsphere aggregate having a rough outer surface, and then heats the microsphere aggregate to a temperature above a glass temperature of the particle with a smaller size to connect the particles with smaller size into a continuous layer, so that a surface of the entire microsphere aggregate becomes smoother with the increase of the heating time.

Another embodiment of the present disclosure provides a display panel, including a first substrate, a second substrate, and a sealant. The second substrate is arranged opposite to the first substrate; the sealant is arranged between the first substrate and the second substrate to assemble the first substrate with the second substrate to form a cell. For instance, the sealant in the display panel may be a sealant obtained by curing and degrading any one of the adhesives described in the above embodiments. Correspondingly, the sealant obtained by performing a curing treatment and a degrading treatment on the adhesive includes a light-shielding material and a component obtained by degrading the degradable coating layer for wrapping the light-shielding material; the component of the sealant varies depending on the material of the degradable coating layer and a degree of a degrading process.

Figure 3:
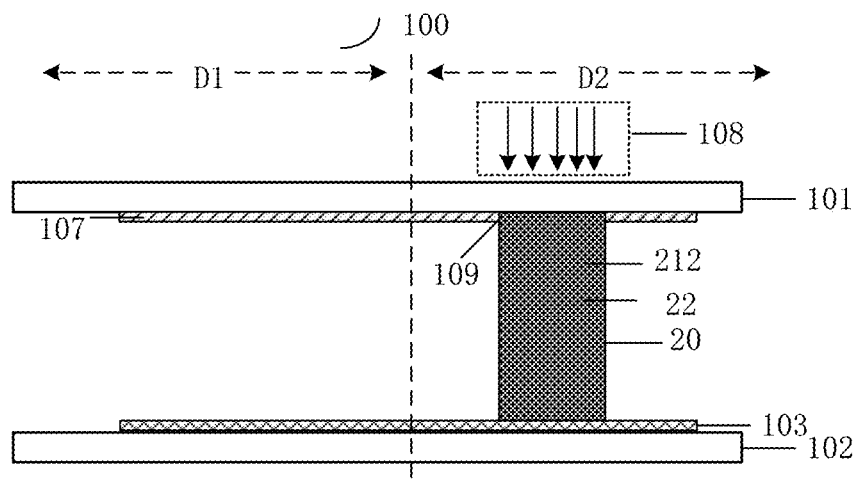
FIG. 3 is a cross-sectional view illustrating a structure of a display panel provided by an example of another embodiment of the present disclosure.

Another embodiment of the present disclosure provides a display panel 100. FIG. 3 is a cross-sectional view illustrating a structure of the display panel 100 provided by this embodiment. The display panel 100 includes any one of the sealants 20 described in the above embodiments, and the sealant 20 is a sealant obtained by curing and degrading any one of the adhesives described in the above embodiments. For instance, the display panel 100 can be any display panel of a suitable type. For instance, the present embodiment is described with reference to the case where the display panel 100 is a liquid crystal display panel, by way of example, without limiting embodiments of the present disclosure thereto.

For instance, as illustrated in FIG. 3, the display panel 100 includes a first substrate 101, a second substrate 102, a sealant 20, and the like. For instance, the first substrate 101 and the second substrate 102 are arranged opposite to each other; and the sealant 20 is arranged between the first substrate 101 and the second substrate 102 to seal the first substrate 101 with the second substrate 102 to form a cell. For instance, the sealant 20 is disposed in a sealing region D2 of the display panel 100. It should be explained that the sealing region D2 herein refers to a region surrounding a display region D1 of the display panel 100. For instance, the first substrate 101 may be an array substrate, and the second substrate 102 may be a color filter substrate; or the first substrate 101 may be a color filter substrate, and the second substrate 102 may be an array substrate. This embodiment is described with reference to the case where the first substrate 101 is an array substrate and the second substrate 102 is a color filter substrate, by way of example.

For instance, as illustrated in FIG. 3, the first substrate 101 may include a plurality of sub-pixel units defined by a plurality of gate lines and a plurality of data lines that are intersected with each other; the plurality of sub-pixel units are located in the display region D1 of the display panel 100. For instance, each of the sub-pixel units includes a thin film transistor (TFT) as a switching element and a pixel electrode for controlling an orientation of liquid crystal molecules. For instance, a gate electrode of the TFT in the sub-pixel unit is electrically connected or integrally formed with a corresponding gate line, a source electrode is electrically connected or integrally formed with a corresponding data line, and a drain electrode is electrically connected or integrally formed with a corresponding pixel electrode. The above-described circuit layer or the like that is not illustrated in FIG. 3 may be formed on a side of the first substrate 101 facing the second substrate 102.

For instance, as illustrated in FIG. 3, a color filter film may be formed on the second substrate 102, and the color filter film is disposed in the display region D1 of the display panel 100. For instance, in an example, the color filter film includes a red filter film, a green filter film, and a blue filter film that are distributed in an array, and these filter films are disposed in one-to-one correspondence with the sub-pixel units. The color filter film or other structure(s) is not illustrated in FIG. 3, and the color filter film may be provided in direct contact with a light-shielding layer 103 or be spaced apart from the light-shielding layer 103.

For instance, as illustrated in FIG. 3, in an example, a light-shielding material 212 is evenly distributed in the base bonding material 22 of the adhesive 20 (a dark portion of the adhesive 20 illustrated in FIG. 3) so that the adhesive 20 has a light-shielding property as a whole. For instance, in a process of manufacturing a display panel 100, after curing the adhesive 20, the cured adhesive 20 is further treated to allow the degradable coating layer 211 in the adhesive 20 to be degraded, and the light-shielding material 212 wrapped in the degradable coating layer 211 is exposed and diffused in the adhesive 20, so that the obtained sealant 20 has a light-shielding property. For the manufacturing method, a detailed description will be given later, without particularly explained in this embodiment. For instance, light that causes the degradable coating layer 211 to be degraded may be light of any wavelength as long as it enables photo-degradation. For instance, a wavelength of light used to cure the adhesive 20 and a wavelength of light used to degrade the degradable coating layer 211 may be the same or different.

For instance, as illustrated in FIG. 3, in an example, the display panel 100 further includes a light-shielding layer 103, a metal wiring 107, and the like. The metal wiring 107 is used, for instance, to achieve electrical connection or signal transmission between the display region D1 and a bonding region other than the sealing region D2.

For instance, as illustrated in FIG. 3, the light-shielding layer 103 is disposed on a side of the second substrate 102 facing the first substrate 101. Of course, in another example, the light-shielding layer 103 may also be disposed on a side of the first substrate 101 facing the second substrate 102. For instance, the light-shielding layer 103 may be disposed in the display region D1 and the sealing region D2 of the display panel 100. For instance, in the display region D1 of the display panel 100, a planar shape of the light-shielding layer 103 is of a grid shape, and every opening (square box) of the light-shielding layer 103 corresponds to, for instance, one sub-pixel unit. For instance, the light-shielding layer 103 in the display region D1 can block light that is not controlled by the rotation of the liquid crystal layer and other light that has an influence on display effect. For instance, a material of the light-shielding layer 103 includes, but is not limited to, a substance that is made by coating an organic resin material on a carbon black particle or a metal material (for instance, chromium) or a metal oxide material (for instance, chromium oxide).

For instance, as illustrated in FIG. 3, the metal wiring 107 is disposed on a side of the first substrate 101 facing the second substrate 102. For instance, in an example, the metal wiring 107 may be electrically connected with a driving chip of the display panel 100. For instance, as illustrated in FIG. 3, the metal wiring 107 is disposed to form an opening 109 in the sealing region D2 of the display panel 100, and an end of the sealant 20 covers the opening 109. It should be explained that, "an end of the adhesive 20 covers the opening 109" includes, as illustrated in FIG. 3, a size of the sealant 20 is not less than a size of the opening 109 of the metal wiring 107 in a direction parallel with the first substrate 101. For instance, in an example, light 108 may be incident on the adhesive 20 from a side where the first substrate 101 is located through the opening 109 of the metal wiring 107 to cure the adhesive 20.

It should be explained that an entire structure of the display panel 100 is not illustrated for the sake of clarity. In order to realize a necessary function of the display panel, those skilled in the art can arrange other structures not illustrated according to an application scenario.

In the display panel 100 provided in this embodiment, the sealant 20 includes a degradable coating layer 211 having been degraded, and a light-shielding material 212, so that the sealant 20 is opaque as a whole. When light provided by a backlight is used to irradiate the display panel 100, the sealant 20 can prevent the light emitted by the backlight from exiting from a viewing side of the display panel 100 through the sealant 20, thereby avoiding defects such as light leakage at an edge of the display panel 100, reducing a brightness of the display panel 100 in a dark state, increasing a contrast ratio of the display panel 100, and improving an image display quality of the display panel 100.

Figure 4:
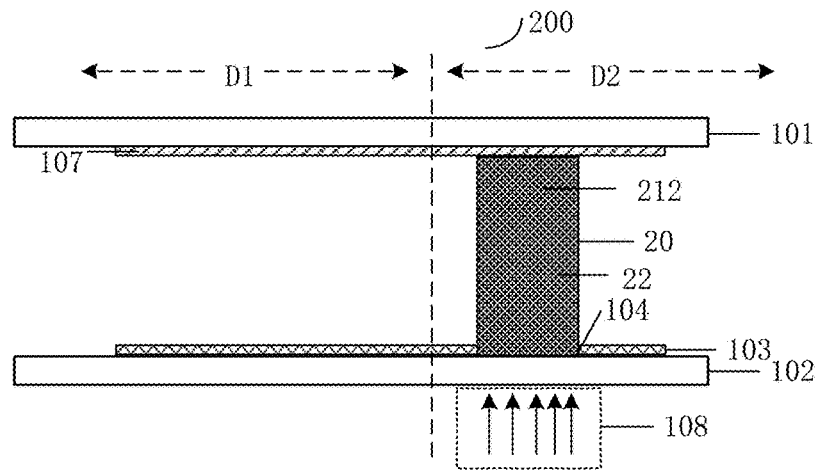
FIG. 4 is a cross-sectional view illustrating a structure of a display panel provided by another example of another embodiment of the present disclosure.

FIG. 4 is a cross-sectional view illustrating a structure of a display panel 200 provided by another example of the present embodiment. Referring to FIG. 4, apart from a structure of the light-shielding layer 103 of the display panel 200, the structure of the display panel 200 provided by the example can be substantially the same as the structure of the display panel 100 illustrated in FIG. 3.

As illustrated in FIG. 4, the light-shielding layer 103 is disposed on a side of the second substrate 102 facing the first substrate 101; the light-shielding layer 103 includes an opening 104 located in the sealing region D2 of the display panel 200; and the sealant 20 having a light-shielding property has an end covering the opening 104. For instance, in the present example, the first substrate 101 is an array substrate, and the second substrate 102 is an opposing substrate.

For instance, in an example, the opposing substrate 102 is provide with a color filter film, and the color filter film is disposed on a side of the opposing substrate 102 facing the array substrate 101. For instance, the color filter film is disposed in a display region D1 of the display panel 200. For instance, the color filter film includes a red filter film, a green filter film, and a blue filter film that are distributed in an array, and these filter films are disposed in one-to-one correspondence with the sub-pixel units of the display panel 200. A structure of the color filter film is not illustrated in FIG. 4, and the color filter film may be disposed in direct contact with the light-shielding layer 103 or spaced apart from the light-shielding layer 103. For instance, in another example, the opposing substrate 102 does not include a color filter film, and the color filter film is disposed on a side of the array substrate 101 facing the opposing substrate 102. For instance, the opposing substrate 102 includes a base substrate, a light-shielding layer 103 and the like disposed on the base substrate. The base substrate may be, for instance, a glass substrate, a quartz substrate, a plastic substrate, or other substrates made of a suitable material, without limiting the embodiments of the present disclosure thereto. For instance, in a process of manufacturing the display panel 200, the adhesive 20 may be irradiated from a side of the display panel where the opposing substrate 102 is located through the opening 104 of the light-shielding layer 103 to cure the adhesive 20 using UV light 108. Compared with the case where the adhesive is irradiated from a side of the display panel where the array substrate 12 is located to cure the adhesive 15 using UV light, because the opening 104 of the light-shielding layer 103 in this example has no other structure having a light-shielding property, a transmittance of the UV light 108 is relatively higher at the opening 104, and most of the UV light 108 can pass through the opening 104 to better cure the adhesive 20, so as to better meet a requirement of a product on a parameter (for instance, thickness, hardness, morphology and other parameters) of the sealant 20 obtained from the adhesive 20. Moreover, a narrow bezel design of the display panel is facilitated by curing the adhesive 20 through the opening 104 in a black matrix. During the use of the above-mentioned display panel, when the light of the backlight is incident on the display panel 200 from the side where the first substrate 101 is located, the sealant 20 having a light-shielding property can block light irradiated on the opening 104 of the light-shielding layer 103, prevent the light of the backlight from exiting through the opening 104 of the light-shielding layer 103, and avoid light leakage in the sealed region of the display panel 200.

For instance, another example of the embodiment further provides a display device including the display panel provided by any one of the embodiments of the present disclosure. For instance, the display device may be a display device such as a liquid crystal display, an organic light emitting diode display, an electronic paper display, or the like; or a product or component having display function including the display device such as a television, a digital camera, a mobile phone, a watch, a tablet computer, a notebook computer, a navigator, and the like. A technical effect of the display device can refer to the technical effect of any one of the display panels described in the foregoing embodiments, without repeated herein.

Figure 5:
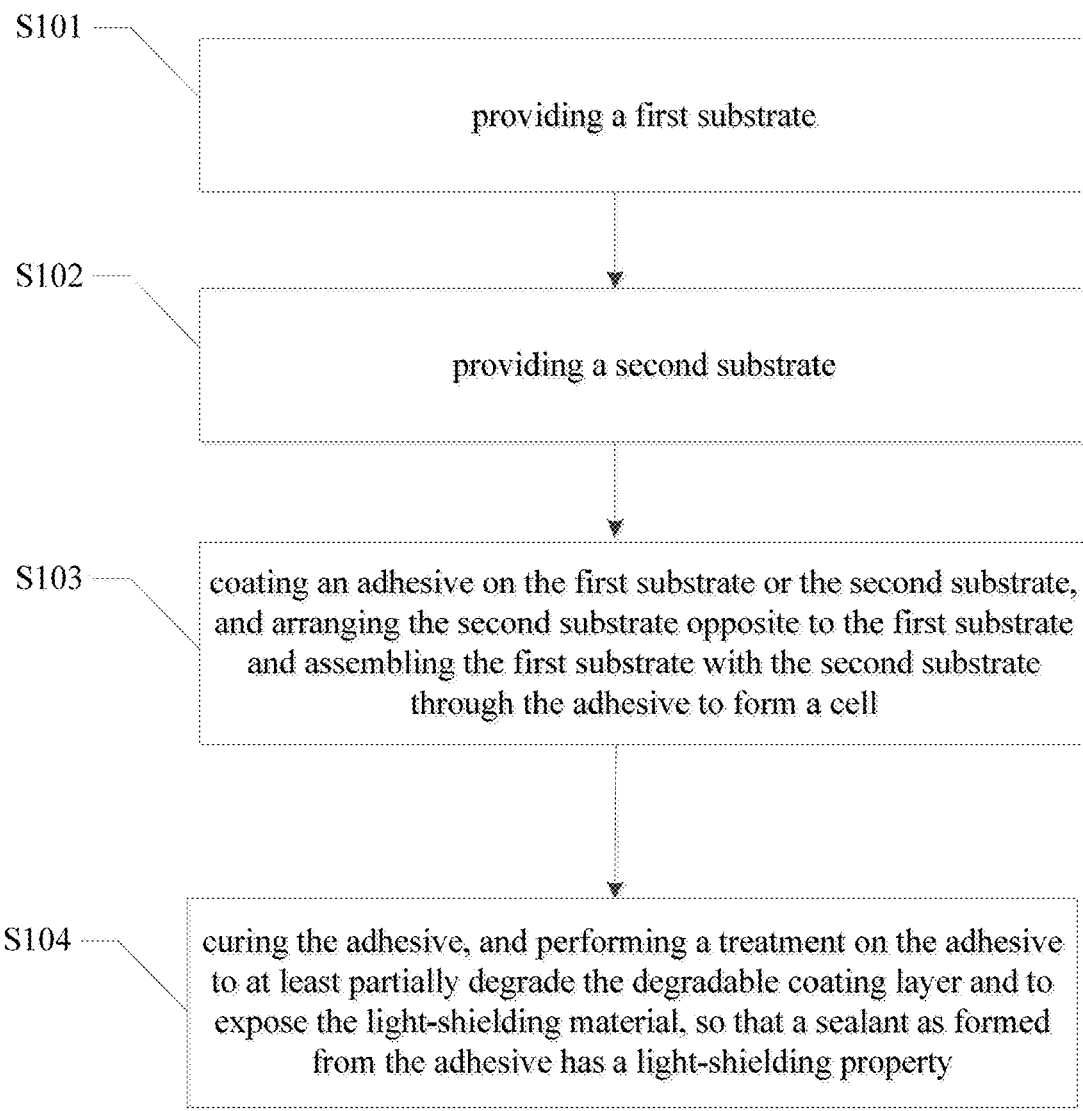
FIG. 5 is a flowchart of a manufacturing process of a display panel provided by yet another embodiment of the present disclosure.

FIG. 5 is a flowchart of a manufacturing method of a display panel provided by another embodiment of the present disclosure, and the manufacturing method can be used, for instance, to manufacture any one of the display panels described in the foregoing embodiments. Referring to FIG. 5, the manufacturing method of the display panel includes the following steps.

Step S101: providing a first substrate.

For instance, the first substrate 101 may be an array substrate.

Step S102: providing a second substrate.

For instance, the second substrate 102 may be a color filter substrate.

Step S103: coating an adhesive on the first substrate or the second substrate, and arranging the second substrate opposite to the first substrate and assembling the first substrate with the second substrate through the adhesive to form a cell. The sealant includes a base bonding material and a light-shielding particle, and the light-shielding particle includes a degradable coating layer and a light-shielding material wrapped by the degradable coating layer.

For instance, in the case where the display panel is a liquid crystal display panel, a liquid crystal layer is located between the first substrate 101 and the second substrate 102, and the adhesive 20 can provide a sealed space for the liquid crystal layer to prevent the liquid crystal layer from being affected by external air. For instance, the adhesive 20 can also play a certain supporting role, so that a cell thickness of the liquid crystal display panel can satisfy a thickness of the liquid crystal layer. The degradable coating layer includes, for instance, any suitable material such as a photodegradable plastic or a thermally degradable plastic; and the light-shielding material includes, for instance, any suitable material such as a black ink or a black resin.

Step S104: curing the adhesive, and performing a treatment on the adhesive to at least partially degrade the degradable coating layer and to expose the light-shielding material, so that a sealant formed from the adhesive has a light-shielding property.

For instance, a treatment performed on the sealant includes but is not limited to light irradiating method, heating method, and the like. When the degradable coating layer is degraded, a wrapping performance of the degradable coating layer is weakened, and the light-shielding material wrapped therein is exposed and then is diffused in the adhesive, so that the sealant as formed has a light-shielding property as a whole.

Another embodiment of the present disclosure provides a manufacturing method of a display panel, which can be used, for instance, to manufacture the display panel described in at least one embodiment above. The present embodiment will be described with reference to the display panel 200 as illustrated in FIG. 4, by way of example. FIG. 6A-FIG. 6E are cross-sectional views illustrating the display panel 200 in the manufacturing process provided by the present embodiment.

Figure 6A:
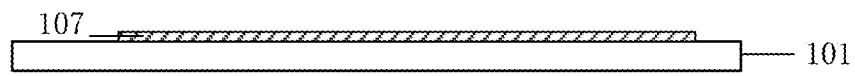
FIG. 6A-FIG. 6E are schematic cross-sectional views of a structure of a display panel during a manufacturing process provided by another embodiment of the present disclosure.

For instance, as illustrated in FIG. 6A, providing an array substrate 101. For instance, a plurality of gate lines and a plurality of data lines may be formed on the array substrate 101. The plurality of gate lines and the plurality of data lines are intersected with each other to define a plurality of sub-pixel units, and the plurality of sub-pixel units are located in the display region D1 of the array substrate 101. For instance, a thin film transistor as a switching element and a pixel electrode configured to control an orientation of liquid crystal molecules are formed in each of the sub-pixel units. For instance, a gate electrode of the thin film transistor in the sub-pixel unit is electrically connected or integrally formed with a corresponding gate line; a source electrode is electrically connected or integrally formed with a corresponding data line; and a drain electrode is electrically connected or integrally formed with a corresponding pixel electrode. The above circuit layer and the like are not illustrated in FIG. 6A.

For instance, as illustrated in FIG. 6A, a metal wiring 107 is further formed on the array substrate 101, and the metal wiring 107 is at least partially located in the sealing region D2 of the array substrate 101. For instance, in an example, the metal wiring 107 may be electrically connected with a driving chip of the display panel 200. It should be explained that the sealing region D2 herein refers to a region surrounding the display region D1 of the array substrate 101.

Figure 6B:
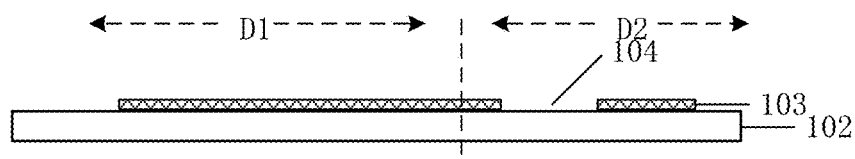

For instance, as illustrated in FIG. 6B, providing an opposing substrate 102. For instance, in an example, the opposing substrate 102 is a color filter substrate. For instance, a color filter film may be formed on the opposing substrate 102, and the color filter film is disposed in the display region D1 of the opposing substrate 102. For instance, in an example, the color filter film includes a red filter film, a green filter film, and a blue filter film that are distributed in an array, and these filter films are disposed in one-to-one correspondence with the sub-pixel units. A structure of the color filter film is not illustrated in FIG. 6B, and the color filter film may be disposed in direct contact with or spaced apart from light-shielding layer 103 that is formed subsequently.

For instance, in another example, a color filter film may also be formed on the array substrate 101, and the opposing substrate 102 includes a base substrate, and a light-shielding layer 103 and the like formed on the base substrate. The base substrate may be, for instance, a substrate of any suitable material such as a quartz substrate, a plastic substrate, or a glass substrate, without limiting the embodiments of the present disclosure thereto.

For instance, as illustrated in FIG. 6B, depositing a light-shielding film on the opposing substrate 102 by, for instance, chemical vapor deposition, physical vapor deposition, or the like, and patterning the light-shielding film by, for instance, a photolithography process to form a light-shielding layer 103 including an opening 104. For instance, in an example, the light-shielding layer 103 may be located in the display region D1 and the sealing region D2 of the color filter substrate 102, and the opening 104 of the light-shielding layer 103 is located in the sealing region D2 of the color filter substrate 102.

For instance, forming the light-shielding layer 103 by a photolithography process includes: forming a photoresist layer (not illustrated) on an entire surface of the light-shielding film after depositing the light-shielding film on the opposing substrate 102; patterning the photoresist layer by using a photoetching method including an exposing step and a developing step to form a photoresist pattern of a desired shape on the light-shielding film; then patterning the light-shielding film using the above photoresist pattern as an etching mask to form a light-shielding layer 103 on the opposing substrate 102. For instance, in the display region D1 of the opposing substrate 102, a planar shape of the light-shielding layer 103 is of a grid shape, and every opening (square box) of the light-shielding layer 103 corresponds to, for instance, one sub-pixel unit. In the sealing region D2 of the opposing substrate 102, the light-shielding layer 103 at least includes an opening 104. For instance, a material of the light-shielding layer 103 includes, but is not limited to, a substance that is made by coating an organic resin material on a carbon black particle or a metal material (for instance, chromium) or a metal oxide material (or chromium oxide).

Of course, the array substrate 102 may be provided firstly, and then the array substrate 101 may be provided; or, the array substrate 101 and the opposing substrate 102 may be simultaneously provided. The order in which the array substrate 101 and the opposing substrate 102 are provided during the manufacturing process may be changed.

Figure 6C:
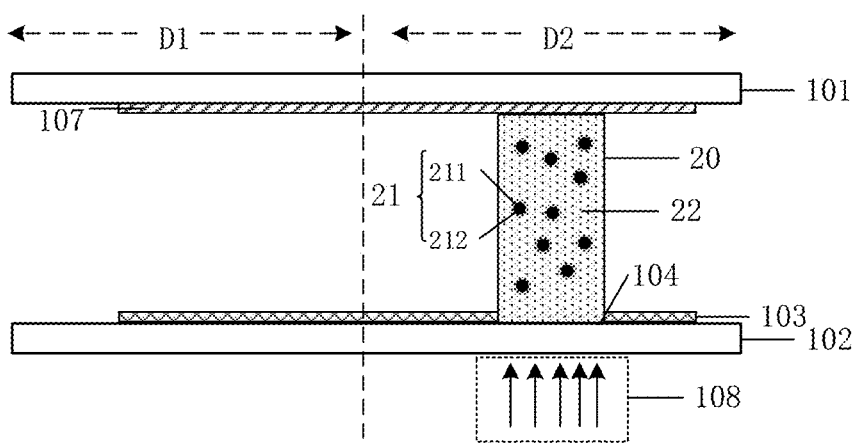

For instance, as illustrated in FIG. 6C, after providing the array substrate 101 and the opposing substrate 102, for instance, coating an adhesive 20 in the sealing region D2 of the array substrate 101 or the sealing region D2 of the opposing substrate 102, and then arranging the array substrate 101 and the opposing substrate 102 opposite to each other (for instance, as illustrated in FIG. 6C, the array substrate 101 is located above the opposing substrate 102, the opposing substrate 102 is located below the array substrate 101), and then bonding the array substrate 101 with the opposing substrate 102 by the adhesive 20 to assemble the array substrate 101 with the opposing substrate 102 to form a cell. For instance, the adhesive 20 includes a base bonding material 22 and a light-shielding particle 21, and the base bonding material 22 is, for instance, a transparent bonding material. For instance, an example of a material of the base bonding material 22 includes any suitable material such as an epoxy resin. For instance, an end of the adhesive 20 close to the opposing substrate 102 covers the opening 104 of the light-shielding layer 103. For instance, in an example, the adhesive 20 is a photo-curable adhesive. For instance, after coating the adhesive 20 in the sealing region D2 of the array substrate 101 or coating the adhesive 20 in the sealing region D2 of the opposing substrate 102, the adhesive 20 needs to be irradiated with light to be cured. The light used herein may be light of a wavelength capable of achieving photo-curing of the adhesive. For instance, in an example, the adhesive 20 is a UV curable adhesive, and the UV light as used may have, for instance, different wavelengths, such as long-wave UV, medium-wave UV and short-wave UV. Because the opening 104 of the light-shielding layer 103 in the embodiment has no other structures having a light-shielding property, a transmittance of the UV light 108 at the opening 104 is relatively higher, and most of the UV light 108 can pass through the opening 104 to better cure the adhesive 20, so as to better meet a requirement of a product on a parameter (for instance, thickness, hardness, morphology and other parameters) of the sealant 20 obtained from the adhesive 20. Moreover, curing the adhesive 20 through the opening 104 in the black matrix facilitates a design of the display panel 200 with a narrow bezel.

For instance, as illustrated in FIG. 6C, the adhesive 20 includes a light-shielding particle 21, the light-shielding particle 21 includes a degradable coating layer 211 and a light-shielding material 212 wrapped by the degradable coating layer 211. For instance, in an example, the light-shielding particles 21 are doped in the base bonding material 22 of the adhesive 20. For instance, an example of a material of the degradable coating layer 211 includes any suitable degradable material such as a photodegradable plastic or a thermally degradable plastic. An example of a material of the light-shielding material 212 includes any suitable light-shielding material such as a black ink or a black resin, and the black ink includes, for instance, a carbon black particle or the like.

Figure 6D:
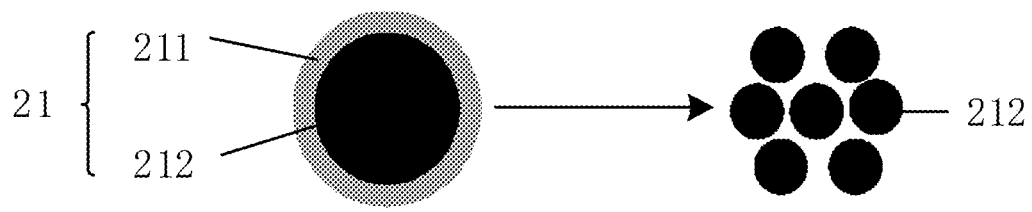

For instance, in an example, as illustrated in FIG. 6C and FIG. 6D, in the case where the degradable coating layer 211 is made of UV photodegradable plastic, when UV light 108 is incident from a side where the opposing substrate 102 is located through an opening 104 of the light-shielding layer 103 to cure the UV photo-curable adhesive 20, the UV photodegradable plastic 211 is at least partially degraded under an irradiation of the UV light 108. For instance, under an irradiation of the UV light, the UV photodegradable plastic 211 absorbs UV radiation to cause photo-initiation, which can weaken a bond energy of the UV photodegradable plastic 211 and reduce a physical property of the UV photodegradable plastic 211, so that a long bond of the UV photodegradable plastic 211 is split into fragments of lower molecular weights or into a compound of a lower molecular weight (i.e., a component of the UV photodegradable plastic after degradation), so that the light-shielding material 212 cannot be wrapped any more. For instance, in an example, the UV photodegradable plastic 211 is a polymer material containing a carbonyl group. When the UV photodegradable plastic 211 is not irradiated with UV light, because a material constituting the UV photodegradable plastic 211 has a high molecular weight, the UV photodegradable plastic 211 can wrap the light-shielding material 212. When the photodegradable plastic 211 is irradiated by UV light, because the carbonyl group is broken under UV light irradiation, a molecular weight of the polymer material including the carbonyl group is lowered. A wrapping performance of the UV photodegradable plastic with a lowered molecular weight (i.e., the degraded UV photodegradable plastic) is weakened, and the light-shielding material 212 wrapped therein is exposed. For instance, in an example, the UV photodegradable plastic 211 includes a photosensitizer, so that a degradation rate of the UV photodegradable plastic 211 can be increased.

Figure 6E:
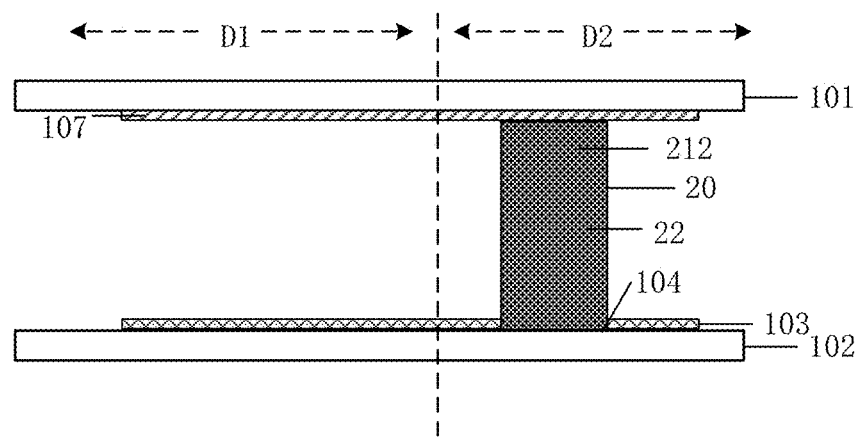

For instance, as illustrated in FIG. 6E, after exposing the light-shielding material 212 from the UV photodegradable plastic 211, heating the adhesive 20. Under the heating condition, the exposed light-shielding material 212 is diffused in the adhesive 20, so that the adhesive 20 has a more uniform light-shielding property. For instance, in an example, the heating method includes baking. For instance, parameters such as heating time and heating temperature can be adjusted correspondingly according to a requirement on product design.

It should be explained that, in the present embodiment, the UV light is used for curing the adhesive 20 and also degrading the UV photodegradable plastic 211. However, the embodiment includes but is not limited thereto. For instance, in another example, a wavelength of light used to cure the adhesive 20 is different from a wavelength of light used to degrade the photodegradable plastic 211. In this case, firstly, light of the first wavelength is incident from a side where the opposing substrate 102 is located through an opening of the light-shielding layer 103, for instance, a black matrix, to cure the adhesive 20; after the adhesive 20 is cured, light of the second wavelength is incident from the side where the opposing substrate 102 is located through the opening 104 of the black matrix to irradiate the cured adhesive 20 to degrade the photodegradable plastic 211 in the adhesive 20. The adhesive 20 is cured firstly and then the photodegradable plastic 211 is degraded. Thus, an exposure of the light-shielding material 212 caused by the degradation of the photodegradable plastic 211 does not affect a curing effect of the adhesive 20.

For instance, in another example, in the case where the degradable coating layer 211 is made of a thermally degradable plastic, firstly, providing the array substrate 101 and the opposing substrate 102 with reference to the method illustrated in FIG. 6A and FIG. 6B; then coating an adhesive 20 onto the sealing region D2 of the array substrate 101 or the sealing region D2 of the opposing substrate 102 with reference to the method illustrated in FIG. 6C; then arranging the array substrate 101 and the opposing substrate 102 opposite to each other (for instance, as illustrated in FIG. 6C, the array substrate 101 is located above the opposing substrate 102, and the opposing substrate 102 is located below the array substrate 101); and then bonding the array substrate 101 with the opposing substrate 102 by the adhesive 20 so that the array substrate 101 and the opposing substrate 102 are assembled with each other to form a cell. The adhesive 20 includes a base bonding material 22 and a light-shielding particle 21, and the base bonding material 22 is a transparent bonding material. After the adhesive 20 is applied onto the array substrate 101 or the opposing substrate 102, light is incident from a side where the opposing substrate 102 is located through the opening 104 of the light-shielding layer 103 to cure the adhesive 20.

For instance, after the adhesive 20 is cured, the cured adhesive 20 is heated. Under a heating condition, the thermally degradable plastic 211 is at least partially degraded, and a wrapping performance of the degraded thermally degradable plastic 211 is decreased to expose the light-shielding material 212 therein. As illustrated in FIG. 6E, under the heating condition, the exposed light-shielding material 212 is diffused in the base bonding material 22 of the adhesive 20, and the so-formed sealant 20 has a more uniform light-shielding property. For instance, in an example, the heating method includes baking. For instance, parameters such as heating time and heating temperature can be adjusted correspondingly according to a requirement on product design.

It should be explained that a degradation temperature of the thermally degradable plastic 211 and a temperature required for the light-shielding material 212 to be diffused in the adhesive 20 may be the same or different.

For instance, in the case where the degradation temperature of the thermally degradable plastic 211 and the temperature required for the light-shielding material 212 to be diffused in the adhesive 20 are different, the cured adhesive 20 may be heated at a first temperature, the thermally degradable plastic 211 is at least partially degraded under the heating condition and a wrapping performance of the degraded, thermally degradable plastic 211 is weakened, so that the light-shielding material 212 wrapped therein is exposed. Then, the adhesive 20 is heated at a second temperature, and the exposed light-shielding material 212 is diffused in the adhesive 20 under the heating condition, so that the formed sealant 20 has a light-shielding property.

In the manufacturing method of the display panel 200 provided by this embodiment, on one hand, the adhesive 20 is cured by providing incident light from a side where the opposing substrate 102 is located through the opening 104 of the light-shielding layer 103. Because the incident light has a high transmittance at the opening 104 of the light-shielding layer 103, the incident light can sufficiently cure the adhesive 20, which can improve a curing effect of the adhesive 20, improve a production efficiency, and contribute to a design of a display panel with a narrow bezel.

On the other hand, the adhesive 20 includes a light-shielding particle 21, and the light-shielding particle 21 includes a degradable covering layer 211 and a light-shielding material 212 wrapped by the degradable covering layer 211, so that the sealant 20 formed from the adhesive has a light-shielding property. An end of the sealant 20 covers the opening 104 of the light-shielding layer 103; as a result, when light, provided by the backlight, for instance, irradiates the display panel 200, the sealant 20 can prevent the light emitted by the backlight from exiting from a viewing side of the display panel 20 through the sealant 20, thereby avoiding a phenomenon of light leakage at an edge of the display panel 200, reducing a brightness of the display panel in a dark state, increasing a contrast ratio of the display panel, and improving an image display quality of the display panel.

The various embodiments of the present disclosure and the features of the embodiments can be combined with each other to obtain a new embodiment without conflict.

The above are only exemplary embodiments employed to explain the principle of the present disclosure, but embodiments of the present disclosure are not limited thereto. For those skilled in the art, any changes or substitutions, obtained without departing from the principles of the present disclosure, should be covered by the protection scope of the present disclosure.

What is claimed is:

1. A display panel, comprising:
    a first substrate;
    a second substrate arranged opposite to the first substrate;
    a sealant located between the first substrate and the second substrate and configured to assemble the first substrate with the second substrate to form a cell, wherein
    the sealant is obtained by performing a curing treatment and a degrading treatment on an adhesive, wherein
    the adhesive comprises a base bonding material and a light-shielding particle, the light-shielding particle comprises a degradable coating layer and a light-shielding material wrapped by the degradable coating layer.

2. The display panel according to claim 1, wherein the second substrate further comprises a light-shielding layer, the light-shielding layer comprises an opening located in a sealing region of the second substrate, and the sealant covers the opening of the light-shielding layer.

3. The display panel according to claim 2, wherein the first substrate comprises an array substrate, and the second substrate comprises an opposing substrate.

4. A display device comprising the display panel according to claim 1.

5. The display device according to claim 4, wherein the second substrate further comprises a light-shielding layer, the light-shielding layer comprises an opening located in a sealing region of the second substrate, and the sealant covers the opening of the light-shielding layer.

6. The display panel according to claim 1, wherein the light-shielding material comprises a black ink or a black resin.

7. The display panel according to claim 1, wherein the degradable coating layer comprises a photodegradable plastic or a thermally degradable plastic.

8. A manufacturing method of a display panel, comprising:
    providing a first substrate;
    providing a second substrate;
    coating an adhesive on the first substrate or the second substrate, assembling the first substrate with the second substrate by the adhesive to form a cell, wherein the adhesive comprises a base bonding material and a light-shielding particle, the light-shielding particle comprises a degradable coating layer and a light-shielding material wrapped by the degradable coating layer;
    curing the adhesive; and
    performing a treatment on the adhesive to at least partially degrade the degradable coating layer and to expose the light-shielding material.

9. The manufacturing method according to claim 8, wherein the light-shielding material comprises a black ink or a black resin.

10. The manufacturing method according to claim 8, wherein the degradable coating layer comprises a photodegradable plastic or a thermally degradable plastic.

11. The manufacturing method according to claim 10, wherein the degradable coating layer is a photodegradable plastic,
    performing a treatment on the adhesive comprises: performing a light irradiation on the adhesive to degrade the photodegradable plastic and to expose the wrapped light-shielding material, and the light irradiation comprises ultraviolet light irradiation.

12. The manufacturing method according to claim 11, wherein performing a treatment on the adhesive further comprises:

heating the adhesive to diffuse the exposed light-shielding material in the adhesive.

13. The manufacturing method according to claim 10, wherein the degradable coating layer is a thermally degradable plastic, and performing a treatment on the adhesive comprises: heating the adhesive to degrade the thermally degradable plastic and to expose the wrapped light-shielding material.

14. The manufacturing method according to claim 8, wherein the second substrate comprises a light-shielding layer, the light-shielding layer comprises an opening located in a sealing region of the second substrate, the manufacturing method further comprises:

covering the opening of the light-shielding layer with the adhesive upon assembling the first substrate with the second substrate to form the cell; and performing light irradiation on the adhesive from a side of the second substrate through the opening of the light-shielding layer to cure the adhesive, wherein the first substrate comprises an array substrate, and the second substrate comprises an opposing substrate.

* * * * *